United States Patent
Kang

(10) Patent No.: US 9,618,045 B1
(45) Date of Patent: Apr. 11, 2017

(54) STRUT BEARING

(71) Applicant: Schaeffler Technologies AG & Co. KG, Herzogenaurach (DE)

(72) Inventor: Bogyu Kang, Rochester Hills, MI (US)

(73) Assignee: Schaeffler Technologies AG & Co. KG, Herzognaurach (DE)

( * ) Notice: Subject to any disclaimer, the term of this patent is extended or adjusted under 35 U.S.C. 154(b) by 0 days.

(21) Appl. No.: 14/944,838

(22) Filed: Nov. 18, 2015

(51) Int. Cl.
*F16C 33/76* (2006.01)
*F16C 33/78* (2006.01)
*F16C 19/10* (2006.01)

(52) U.S. Cl.
CPC ........ *F16C 33/7823* (2013.01); *F16C 33/761* (2013.01); *F16C 19/10* (2013.01)

(58) Field of Classification Search
CPC .. F16C 33/761; F16C 33/782; F16C 33/7823; F16C 33/7826; F16C 33/7886; F16C 2326/05
See application file for complete search history.

(56) References Cited

U.S. PATENT DOCUMENTS

| 5,618,116 A | * | 4/1997 | Ishikawa ................ F16C 19/10 277/361 |
| 8,506,171 B2 | | 8/2013 | Stautner et al. |
| 8,840,316 B2 | * | 9/2014 | Montboeuf .......... B60G 15/068 384/607 |
| 2014/0167360 A1 | | 6/2014 | Weiss, II |

FOREIGN PATENT DOCUMENTS

FR 2985220 * 1/2012

OTHER PUBLICATIONS

Translation of FR2985220 obtained Aug. 18, 2016.*

* cited by examiner

*Primary Examiner* — James Pilkington
(74) *Attorney, Agent, or Firm* — Volpe and Koenig, P.C.

(57) ABSTRACT

A strut bearing including an improved seal configuration is disclosed. The strut bearing includes an upper carrier including a first outer axially extending rim and a first inner axially extending rim, and a lower carrier including a second outer axially extending rim and a second inner axially extending rim. The first outer axially extending rim at least partially surrounds the second outer axially extending rim. A rolling bearing is supported between the upper and lower carriers. A seal includes at least one sealing lip and a reinforcement rim, and the at least one sealing lip is molded on to the reinforcement rim. The seal extends between the first outer axially extending rim of the upper carrier and the second outer axially extending rim of the lower carrier.

13 Claims, 1 Drawing Sheet

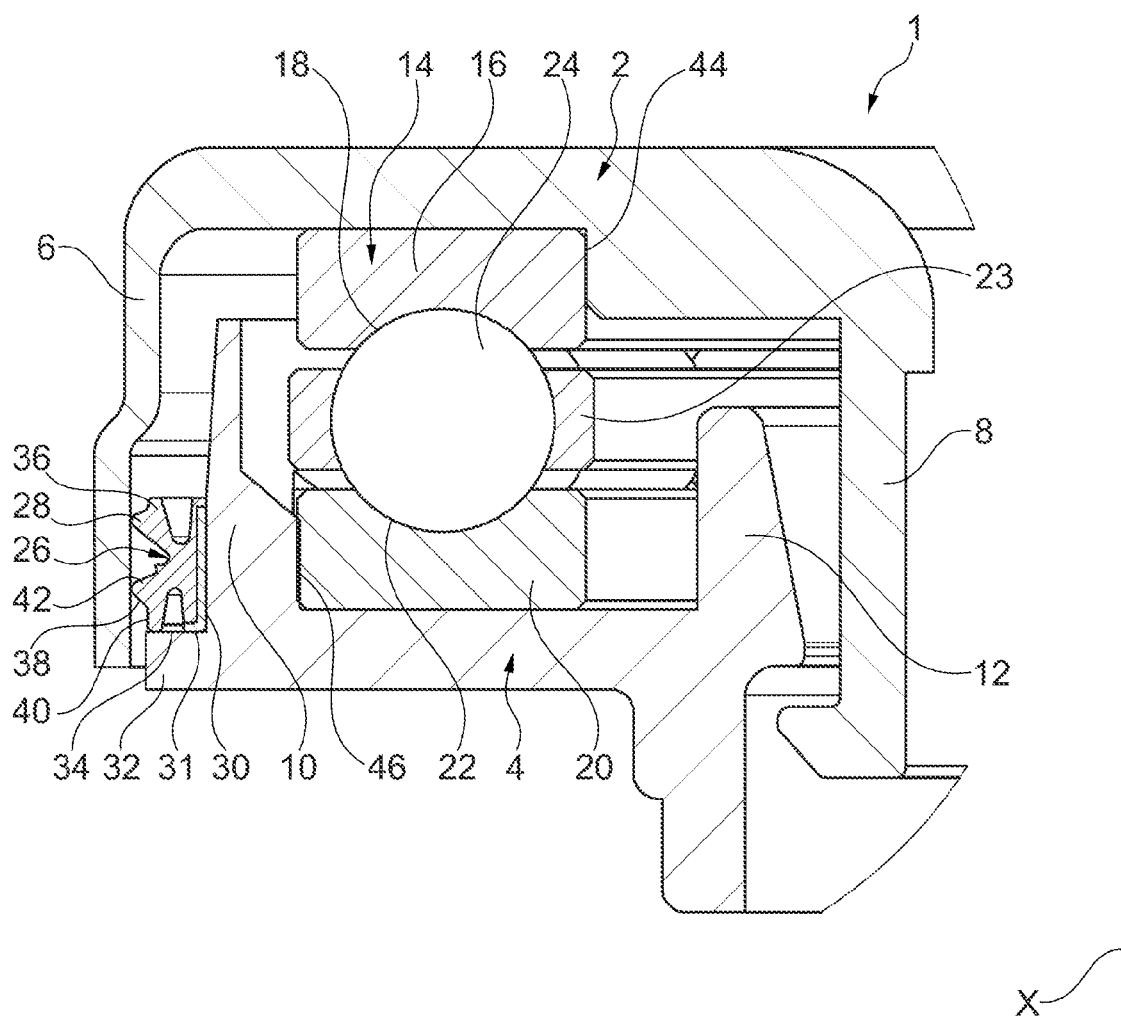

STRUT BEARING

FIELD OF INVENTION

The present invention relates to a strut bearing, and is more particularly related to a seal for a strut bearing.

BACKGROUND

Strut bearings are used in a wide range of applications, such as in vehicle suspension systems, and particularly for MacPherson struts. Strut bearings typically include an upper carrier and a lower carrier, with a rolling bearing supported therebetween. Due to gaps between the upper carrier and the lower carrier, undesirable foreign substances and debris can enter the strut bearing, causing the rolling bearing to malfunction or fail. One known arrangement for addressing this problem is shown in U.S. Pat. No. 8,506,171, which discloses a sealing ring and lip. Another solution is shown in U.S. Pub. 2014/0167360, which discloses a rolling diaphragm seal. These known seal configuration may be difficult to manufacture and expensive, and may also not have the high reliability required in certain applications for protecting the rolling bearing from debris.

SUMMARY

A strut bearing including an improved and simplified seal configuration is provided. The strut bearing includes an upper carrier having a first outer axially extending rim and a first inner axially extending rim, and a lower carrier having a second outer axially extending rim and a second inner axially extending rim. The first outer axially extending rim at least partially surrounds the second outer axially extending rim. A rolling bearing is supported between the upper and lower carriers. A seal is provided that includes at least one sealing lip and a reinforcement rim molded on to the at least one sealing lip. The seal extends between the first outer axially extending rim of the upper carrier and the second outer axially extending rim of the lower carrier.

BRIEF DESCRIPTION OF THE DRAWINGS

The foregoing Summary and the following detailed description will be better understood when read in conjunction with the appended drawing, which illustrates a preferred embodiment of the invention. In the drawing:

FIG. 1 shows a cross-sectional view of a strut bearing with a seal arranged between an upper carrier and a lower carrier.

DETAILED DESCRIPTION OF THE PREFERRED EMBODIMENTS

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 shows a strut bearing 1 including an upper carrier 2 and a lower carrier 4. The upper carrier 2 includes a first outer axially extending rim 6 and a first inner axially extending rim 8. The lower carrier 4 includes a second outer axially extending rim 10 and a second inner axially extending rim 12. The first outer axially extending rim 6 of the upper carrier 2 at least partially surrounds the second outer axially extending rim 10 of the lower carrier 4. In a preferred embodiment, the second inner axially extending rim 12 at least partially surrounds the first inner axially extending rim 8. The upper and lower carriers 2, 4 are preferably molded from plastic. In one embodiment, the upper and lower carries 2, 4, are formed from PA66 Gf33 plastic.

A rolling bearing 14 includes an upper ring 16 defining an upper race 18, and the upper ring 16 is supported on the upper carrier 2. A lower ring 20 defines a lower race 22, and the lower ring 20 is supported on the lower carrier 4. Rolling elements 24 are supported between the upper ring 16 and the lower ring 20, and the rolling elements 24 run on the upper race 18 and the lower race 22. The rolling elements 24 may be retained by a bearing cage 23. As shown in FIG. 1, the upper carrier 2 preferably includes a radially inner support shoulder 44, and the upper ring 16 is supported on the radially inner support shoulder 44 of the upper carrier 2. The lower carrier 4 preferably includes a radially outer support shoulder 46, and the lower ring 20 is supported on the radially outer support shoulder 46 of the lower carrier 4. One of ordinary skill in the art would recognize from the present application that other mounting configurations can be provided for the rolling bearing 14 between the upper carrier 2 and the lower carrier 4. In another embodiment, a plain bearing can be arranged between the upper carrier 2 and the lower carrier 4.

A seal 26 is provided that includes at least one sealing lip 28 and a reinforcement rim 30, and the at least one sealing lip 28 is molded on to the reinforcement rim 30. The seal 26 extends between the first outer axially extending rim 6 of the upper carrier 2 and the second outer axially extending rim 10 of the lower carrier 4. The reinforcement rim 30 is preferably formed from steel. The at least one sealing lip 28 is preferably formed from an elastomer, such as butyl rubber or a suitable polymeric material. One of ordinary skill in the art would recognize from the present application that other materials could be used for the rim 30 and the lip 28 so long a reliable sealing contact is provided. The reinforcement rim 30 preferably has an L-shaped body 31. As shown in FIG. 1, the lower carrier 4 includes a radially outward projection 32 extending from the second outer axially extending rim 10 that defines a mounting shoulder 34, and the L-shaped body 31 of the reinforcement rim 30 is arranged on the seal mounting shoulder 34. The L-shaped body 31 provides a mounting arrangement for fixed positioning on the seal 26 on the mounting shoulder 34 of the lower carrier 4 that is simpler and more reliable than the mounting arrangements found in the prior art.

The at least one sealing lip 28 preferably includes a first sealing lip 36 and a second sealing lip 38 each contacting the first outer axially extending rim 6 of the upper carrier 2, and a third sealing lip 40 contacting the radially outward projection 32 of the lower carrier 4. The third sealing lip 40 preferably extends from a portion 42 of the second sealing lip 38. The first sealing lip 36 preferably extends upwardly in a direction of the upper carrier 2, and the second sealing lip 38 preferably extends downwardly in a direction of the lower carrier 4. This multiple sealing lip configuration provides a more reliable seal than the seals provided in the prior art.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A strut bearing comprising:
   an upper carrier including a first outer axially extending rim and a first inner axially extending rim;
   a lower carrier including a second outer axially extending rim, a second inner axially extending rim, and a radially outward projection extending from the second radially outer axially extending rim, and the first outer axially extending rim at least partially surrounds the second outer axially extending rim;
   a rolling bearing including an upper ring defining an upper race, the upper ring supported on the upper carrier, a lower ring defining a lower race, the lower ring supported on the lower carrier, and rolling elements supported between the upper ring and the lower ring, and the rolling elements run on the upper race and the lower race; and
   a seal including at least one sealing lip and a reinforcement rim, the at least one sealing lip is molded on to the reinforcement rim, the seal extends between the first outer axially extending rim of the upper carrier and the second outer axially extending rim of the lower carrier, the at least one sealing lip includes a first sealing lip and a second sealing lip each contacting the first outer axially extending rim of the upper carrier, and a third sealing lip contacting the radially outward projection of the lower carrier.

2. The strut bearing of claim 1, wherein the second inner axially extending rim at least partially surrounds the first inner axially extending rim.

3. The strut bearing of claim 1, wherein the reinforcement rim is formed from steel.

4. The strut bearing of claim 1, wherein the at least one sealing lip is formed from an elastomer.

5. The strut bearing of claim 1, wherein the reinforcement rim has an L-shaped body, the radially outward projection defining a mounting shoulder, and the L-shaped body of the reinforcement rim is arranged on the seal mounting shoulder.

6. The strut bearing of claim 5, wherein the third sealing lip extends from a portion of the second sealing lip.

7. The strut bearing of claim 5, wherein the first sealing lip extends upwardly in a direction of the upper carrier.

8. The strut bearing of claim 5, wherein the second sealing lip extends downwardly in a direction of the lower carrier.

9. A strut bearing comprising:
   an upper carrier including a first outer axially extending rim and a first inner axially extending rim;
   a lower carrier including a second outer axially extending rim, a second inner axially extending rim, and a radially outward projection extending from the second radially outer axially extending rim, and the first outer axially extending rim at least partially surrounds the second outer axially extending rim;
   a bearing arranged between the upper carrier and the lower carrier; and
   a seal including at least one sealing lip and a reinforcement rim, the at least one sealing lip is molded on to the reinforcement rim, the seal extends between the first outer axially extending rim of the upper carrier and the second outer axially extending rim of the lower carrier, the at least one sealing lip includes a first sealing lip and a second sealing lip each contacting the first outer axially extending rim of the upper carrier, and a third sealing lip contacting the radially outward projection of the lower carrier.

10. The strut bearing of claim 9, wherein the second inner axially extending rim at least partially surrounds the first inner axially extending rim.

11. The strut bearing of claim 9, wherein the reinforcement rim is formed from steel.

12. The strut bearing of claim 9, wherein the at least one sealing lip is formed from an elastomer.

13. The strut bearing of claim 9, wherein the reinforcement rim has an L-shaped body, the radially outward projection defining a mounting shoulder, and the L-shaped body of the reinforcement rim is arranged on the seal mounting shoulder.

* * * * *